O. N. EBERT.
MEANS FOR MOUNTING MOTOR VEHICLE BODIES.
APPLICATION FILED OCT. 31, 1919.

1,355,823.

Patented Oct. 19, 1920.

INVENTOR:
Otto N. Ebert,
By Frank H. Woerner
ATTORNEY.

UNITED STATES PATENT OFFICE.

OTTO N. EBERT, OF INDIANAPOLIS, INDIANA, ASSIGNOR OF FORTY ONE-HUNDREDTHS TO ALBERT B. SWARTZ, OF INDIANAPOLIS, INDIANA.

MEANS FOR MOUNTING MOTOR-VEHICLE BODIES.

1,355,823.     Specification of Letters Patent.     Patented Oct. 19, 1920.

Application filed October 31, 1919. Serial No. 334,790.

*To all whom it may concern:*

Be it known that I, OTTO N. EBERT, a citizen of the United States, residing at Indianapolis, in the county of Marion and State of Indiana, have invented certain new and useful Improvements in Means for Mounting Motor-Vehicle Bodies, of which the following is a specification.

This invention relates to certain means for mounting bodies to the chassis of motor vehicles; and one of the objects of the invention is to yieldingly support a body upon a motor vehicle chassis so as to greatly improve the riding qualities of the vehicle without the use of supplemental shock absorbing devices, as now obtains in the art.

A further object of the invention consists in the provision of means of the above character wherein the tension may correspondingly be increased or decreased to meet the varying conditions arising from overloading.

A still further object of the invention consists in the provision of means for supporting a body upon the chassis of a motor vehicle whereby the driver, after noting the effect of the load carried upon the vehicle, can increase or decrease the tension so as to improve the riding quality of the vehicle, and this can be accomplished while the vehicle is in motion.

I accomplish the above objects of the invention, and such others as may appear from a perusal of the following description and claims, by means of the construction illustrated in the accompanying drawing, forming a part hereof—

Figure 1 is a side elevation of a conventional style of a motor vehicle disclosing the appearance of a body supported by means of my invention. Fig. 2 is a fragmentary detail longitudinal sectional view, on an enlarged scale, showing the relationship of the parts of my invention in operative position. Fig. 3 is a top or plan view of the construction shown in Fig. 2. Fig. 4 is a cross section of the line 4—4 in Fig. 2. Fig. 5 is a fragmentary detail view in side elevation of one end of the body supporting springs.

Referring to the drawings, 10 represents the motor vehicle body and 11 the side-beams of the chassis which are supported by the axles 12 through the medium of the customary springs 15.

Extending transversely of body 10 and intermediate the ends of side-beams 11 is a rocker-shaft 17 which is supported in bearings 18 mounted upon the side-beams 11. Body 10 is mounted upon transverse shaft 17 by means of the side-plates 19 through which said shaft 17 passes, which construction would permit an unrestrained body to freely oscillate upon said shaft 17. To control the range of oscillation of body 10 upon shaft 17, under varying load conditions, is the chief object of the present invention, and consists in utilizing a pair of auxiliary leaf springs 25, one of which is arranged parallel along the inner side of each beam 11. Springs 25 are securely fastened intermediate their ends to rocker-shaft 17 by the usual U-shaped bolts 20, and the ends of said springs pass freely between friction rollers 26 which are arranged in the housings 27 secured to the inner and lower sides of vehicle body 10. The forward end of each auxiliary spring 25 is formed into an eye 30, adapted to receive the trunnion end 31 of an adjustable floating cross-bar 32, whereby the adjacent ends of springs 25 are not only connected together but through which a tension is applied to said springs. A vertically disposed adjusting screw-shaft 35 is threaded through the central portion of floating cross-bar 32 and through a fixed transverse-bar 36 which is rigidly attached at its ends to side-beams 11. The lower portion of adjusting screw-shaft 35 is reduced in diameter to form a shoulder 37 which rides upon the upper surface of transverse-bar 36, and by passing a cotter-pin 38 through the free exposed end of said screw-shaft beneath transverse-bar 36 screw-shaft 35 is free to rotate but is held against longitudinal travel. The upper end of screw-shaft 35 is squared to receive a wrench and is arranged to project through an opening 13 in floor 14 of body 10 and near the driver's feet, so that the tension on springs 25 may be increased or reduced while the vehicle is under movement. By means of the foregoing described construction, it will be observed that screw-shafts 35 may be rotated to elevate or depress floating transverse-bar 36 and connected ends of the auxiliary springs 25, and thereby increase or decrease the tension of said springs to meet conditions incident to the variation in weight of loads carried and thereby improve the riding qualities of the vehicle.

With the foregoing invention in mind, it will be observed that after the vehicle has been loaded and is under way, and the driver determines that the load is too heavy or too light for the amount of resistance offered by the supplemental auxiliary springs 25, he can increase or decrease the resilient properties of said auxiliary springs 25, through screw-shaft 35 and floating cross-bar 32 to more neary stabilize the different lines of force by removing any inequalities that may exist between the effect of the load and the resistance offered by said springs, and thereby not only improve the riding qualities of the vehicle but relieve the other parts of the vehicle and tires of undue stress and wear.

Having thus fully described my invention, what I desire to secure by Letters Patent, is—

1. In a support for vehicle bodies of the character described, a vehicle frame, a vehicle body, body-supporting means arranged between the body and frame for resiliently supporting said body intermediate its length upon the frame, and means for varying the flexing properties of the supporting-means to meet the effects produced on the body through the variable weights of different loads.

2. In a support for vehicle bodies of the character described, a vehicle frame, a vehicle body, a shaft arranged transversely and intermediate the ends of the frame, a pair of body-supporting springs carried by said shaft and having one of their ends in working engagement with the vehicle body, an adjusting-bar for connecting the free ends of the springs together, and means passing through the adjusting-bar and a fixed portion of the frame for varying the flexing properties of the springs.

3. In a support for vehicle bodies of the character described, a vehicle frame, a vehicle body, a shaft arranged transversely and intermediate the ends of the frame, a pair of body-supporting springs carried by said shaft, means carried by the body for loosely supporting one end of the body-supporting springs, a bar for holding the opposite ends of the springs in spaced relation, and means passing through the bar and a fixed portion of the frame for increasing and decreasing the resilient properties of the springs.

4. In a support for vehicle bodies of the character described, a vehicle frame, a vehicle body, a transverse shaft carried by the frame and intermediate its ends, a pair of body-supporting springs carried by said shaft, means for connecting one end of the springs to the vehicle body, and means for simultaneously and uniformly varying the resilient properties of said springs.

In witness whereof I have hereunto set my hand and seal at Indianapolis, Indiana, this 21st day of October, A. D. one thousand nine hundred and nineteen.

OTTO N. EBERT. [L. S.]